(12) United States Patent
Sempier

(10) Patent No.: US 11,700,978 B2
(45) Date of Patent: Jul. 18, 2023

(54) VEHICLE-MOUNTED HAND SANITIZING SYSTEM

(71) Applicant: Michael Joseph Sempier, Orlando, FL (US)

(72) Inventor: Michael Joseph Sempier, Orlando, FL (US)

( * ) Notice: Subject to any disclaimer, the term of this patent is extended or adjusted under 35 U.S.C. 154(b) by 0 days.

(21) Appl. No.: 17/526,880

(22) Filed: Nov. 15, 2021

(65) Prior Publication Data

US 2023/0148801 A1 May 18, 2023

(51) Int. Cl.
*A47K 5/12* (2006.01)
*B60R 15/00* (2006.01)

(52) U.S. Cl.
CPC ............ *A47K 5/1202* (2013.01); *B60R 15/00* (2013.01)

(58) Field of Classification Search
CPC .............................. A47K 5/1202; B60R 15/00
See application file for complete search history.

(56) References Cited

U.S. PATENT DOCUMENTS

| | | | |
|---|---|---|---|
| 9,758,101 B2 * | 9/2017 | Clair-Chalupka | ........ B60R 1/04 |
| 11,292,393 B1 * | 4/2022 | Baker | ...................... A47K 5/13 |
| 2012/0012196 A1 * | 1/2012 | Gallo | ...................... B60R 15/00 |
| | | | 137/234.6 |
| 2014/0042187 A1 * | 2/2014 | Pesach | .................... B60R 15/00 |
| | | | 222/608 |
| 2015/0250908 A1 * | 9/2015 | Maupin | ................. B05B 12/122 |
| | | | 239/69 |
| 2016/0221019 A1 * | 8/2016 | Bassett | ............... B05B 11/3042 |

* cited by examiner

*Primary Examiner* — Jeremy Carroll

(74) *Attorney, Agent, or Firm* — Jason T. Daniel, Esq.; Daniel Law Offices, P.A.

(57) ABSTRACT

A vehicle-mounted hand sanitizing system includes a fluid storage container having a main body and connectors for securement along or within a motor vehicle. A pump is in communication with the main body and a power supply. At least one mirror dispensing unit is connected to the pump by a control and supply line. Each of the at least one mirror dispensing units includes an automobile mirror assembly having a mirror housing, attachment column, mirrored surface, and a fluid discharge nozzle. A control switch is disposed along the mirror housing and is connected to a controller located within the at least one mirror housing. A hand sensor is provided along the mirror housing and is in communication with the control switch to activate the pump upon detecting the presence of a user's hand within a detection area.

16 Claims, 5 Drawing Sheets

VEHICLE-MOUNTED HAND SANITIZING SYSTEM

TECHNICAL FIELD

The present invention relates generally to the automotive industry, and more particularly to an automobile-mounted hand sanitizing system.

BACKGROUND

The statements in this section merely provide background information related to the present disclosure and may not constitute prior art.

Recent world health events have ushered in a new era that requires everyone do their part to prevent the spread of contagions. Aside from using personal protective equipment (PPE), such as facemasks, for example, individuals are encouraged to constantly wash and/or sanitize their hands.

For this reason, many commercial establishments such as restaurants and grocery stores, for example, have begun to provide portable hand sanitizers at building entrances. Although useful, there are far more locations that do not provide these devices. As such, most individuals are unable to properly wash or sanitize their hands upon arriving and leaving a locale. In addition to the sanitizing benefits, there are also circumstances where individuals simply need to wash grime and dirt from their hands before entering their vehicle.

Accordingly, it would be beneficial to provide a vehicle-mounted hand sanitizing system so as to overcome the difficulties described above.

SUMMARY OF THE INVENTION

The present invention is directed to a vehicle-mounted hand sanitizing system. One embodiment of the present invention can include a fluid storage container having a main body and connectors for securement along or within a motor vehicle. A pump can be provided along the main body and can be in communication with a power supply. At least one mirror dispensing unit can be connected to the pump by a control and supply line. Each of the at least one mirror dispensing units can include an automobile mirror assembly having a mirror housing, attachment column, mirrored surface, and a fluid discharge nozzle.

In one embodiment, a control switch can be disposed along the mirror housing. The control switch can be connected to a controller that is located within the mirror housing and can function to selectively activate the pump to supply fluid stored within the container body to the discharge nozzle.

In one embodiment, a hand sensor can be provided along the mirror housing. The hand sensor can be in communication with the control switch and the controller and can function to activate the pump upon detecting the presence of a user's hand within a detection area.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
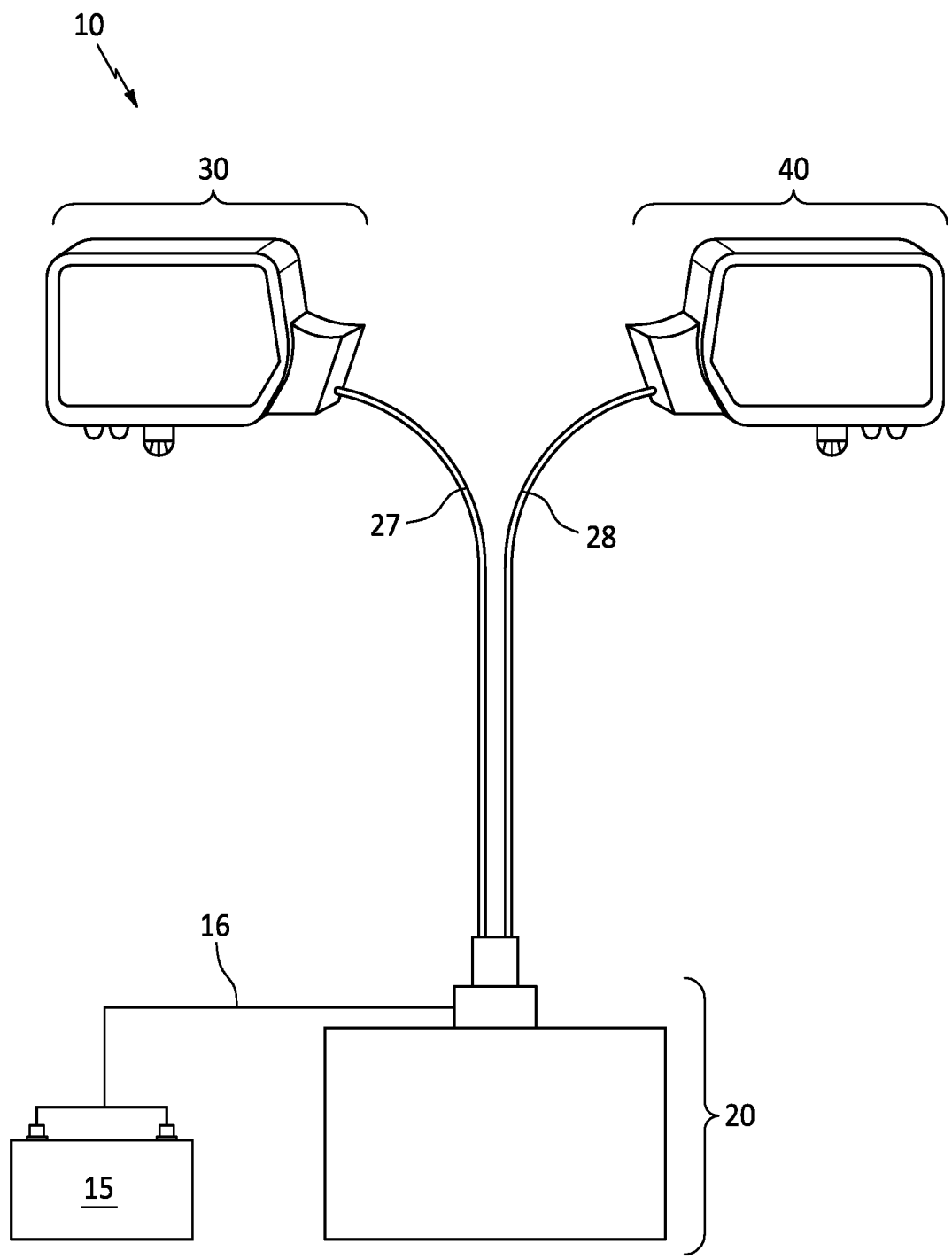
FIG. 1 is a schematic diagram showing a vehicle-mounted hand sanitizing system having two mirror dispensing units, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples include opposing strips of hook and loop material (i.e., Velcro®), attractively-oriented magnetic elements, flexible strips of interlocking projections with a slider (i.e., zipper), a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

Although described and illustrated with regard to an automobile, those of skill in the art will recognize that the inventive concepts can be incorporated into any number of other types of vehicles such as a motorcycle, ATV, boat, or aircraft, among others, for example. Accordingly, the inventive concepts are not to be construed as limiting to an automobile.

FIGS. 1-5 illustrate one embodiment of a vehicle-mounted hand sanitizing system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in FIG. 1, the system 10 can include, essentially, a reservoir and pumping assembly 20 that is connected to at least one, but preferably two mirror dispensing units 30 and 40.

Figure 2:
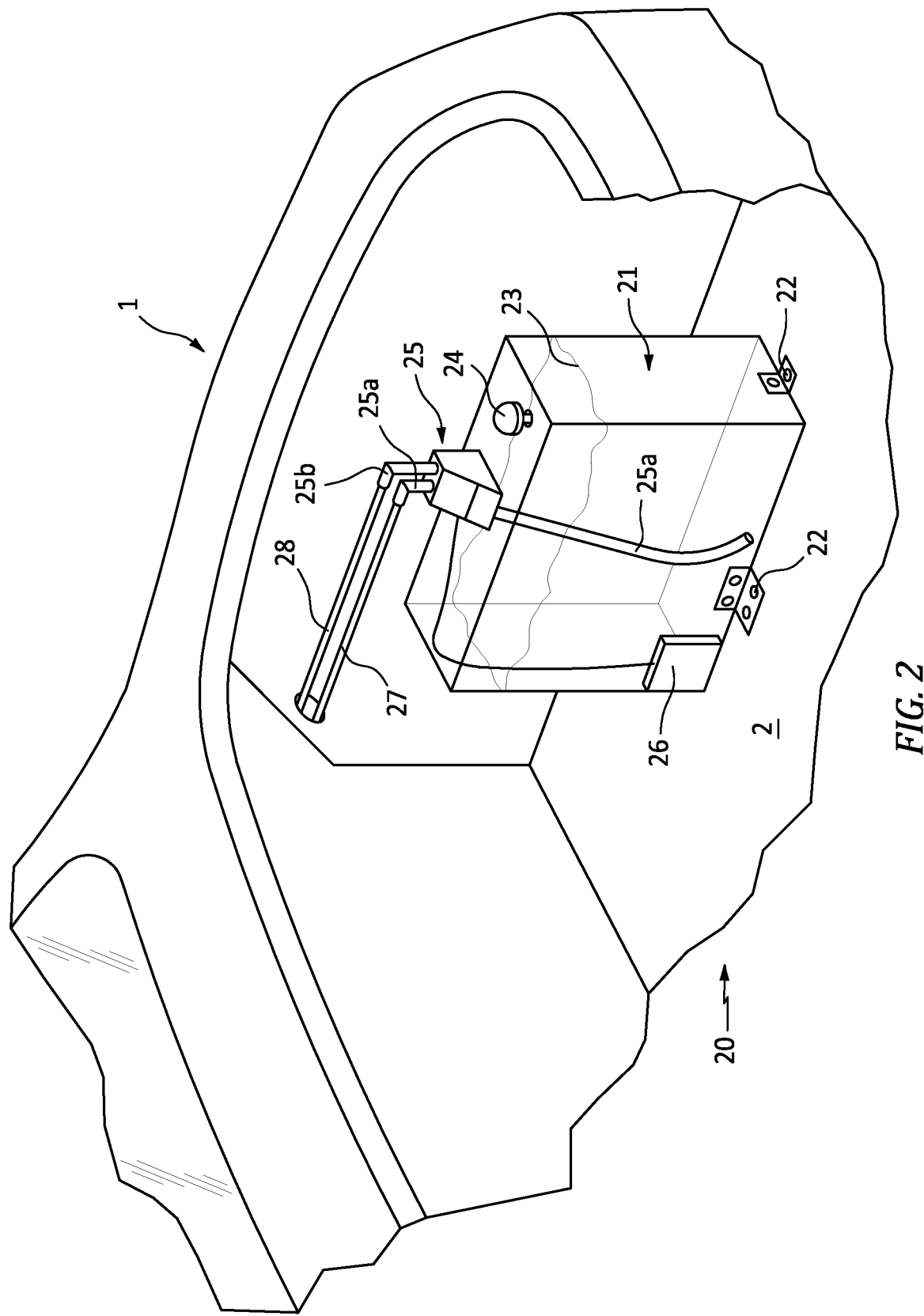
FIG. 2 is a fragmentary perspective view of a vehicle with the reservoir and pumping assembly, in accordance with one embodiment of the invention.

FIG. 2 illustrates one embodiment of the reservoir and pumping assembly 20. As shown, the assembly can be manufactured so as to be positioned within a vehicle 1, preferably at a location such as the trunk 2 or engine compartment, for example. As shown, the assembly can include a container 21 having a plurality of sides that define a hollow and watertight interior space. Connectors 22 can be disposed along the exterior of the container and can function to removably or permanently mount the container onto the vehicle.

In the preferred embodiment, the container 21 will be capable of storing up to five gallons of fluid 23 such as liquid hand sanitizer, water, or a mixture of water and soap, for example, and can have a removable lid 24 for refilling the same. Of course, many other embodiments are also contemplated, wherein the container stores a different amount of fluid and/or is refillable via other means. For example, one embodiment is contemplated wherein the container is positioned within an outer housing such that the container itself can be removed and replaced with a different container having a different fluid.

As such, the container 21 can include any number of different shapes, sizes, and construction materials suitable for housing liquids over an extended period of time (e.g., months or years) while being exposed to a vast array of temperature variations. To this end, the container 21 may be formed from materials that are, for example, relatively strong and stiff for their weight. Several nonlimiting examples include, but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

In one embodiment, a pump 25 can be positioned along the container so as to be in fluid communication with the container contents. As described herein, the pump 25 can include, comprise, or consist of any type of electrically operated fluid dispensing pump that can selectively remove fluid 23 from the container and dispense the same to one or both of the below described mirror dispensing units 30 and 40 via supply and control lines 27 and 28, respectively.

In one embodiment, the pump 25 can include two distinct outputs 25a and 25b that are connected to supply and control lines 27 and 28, respectively. Each of the outputs 25a and 25b can include an electrically operated valve so as to permit a single pump to selectively dispense fluid to one of the dispensing units upon receiving a command from the same. Of course, any number of components capable of permitting each of the below described mirror dispensing units 30 and 40, to receive fluids from the reservoir and pumping assembly 20 on demand are also contemplated.

In the illustrated embodiment, the pump 25 can be positioned along the top of the container and can include a suction pipe 25a for removing the fluid 23; however other embodiments are contemplated wherein the pump is connected to the bottom end of the container so as to receive fluid 23 via gravity, as is known in the art. Moreover, each of the supply and control lines can include a hollow tubular member for moving fluid from the pump outputs 25a and 25b to the dispensers, along with a control line for sending electronic signals between the dispensers and the pump.

In one embodiment, a fluid level sensor 26 can be positioned along the bottom end of the container and can function to provide a low fluid notification to the below described mirror dispensing units and/or to disable the pump upon detecting the fluid level within the container is below a predetermined threshold (e.g., 5%).

In one embodiment, the system 10 can include a dedicated battery 15 that is connected to the pump 25 and dispensing units; however other embodiments are also contemplated wherein the pump and/or dispensing units can be connected to the vehicles' onboard power supply in a number of arrangements, for example at the vehicles fuse panel or the vehicle battery directly via wires 16.

Figure 3:
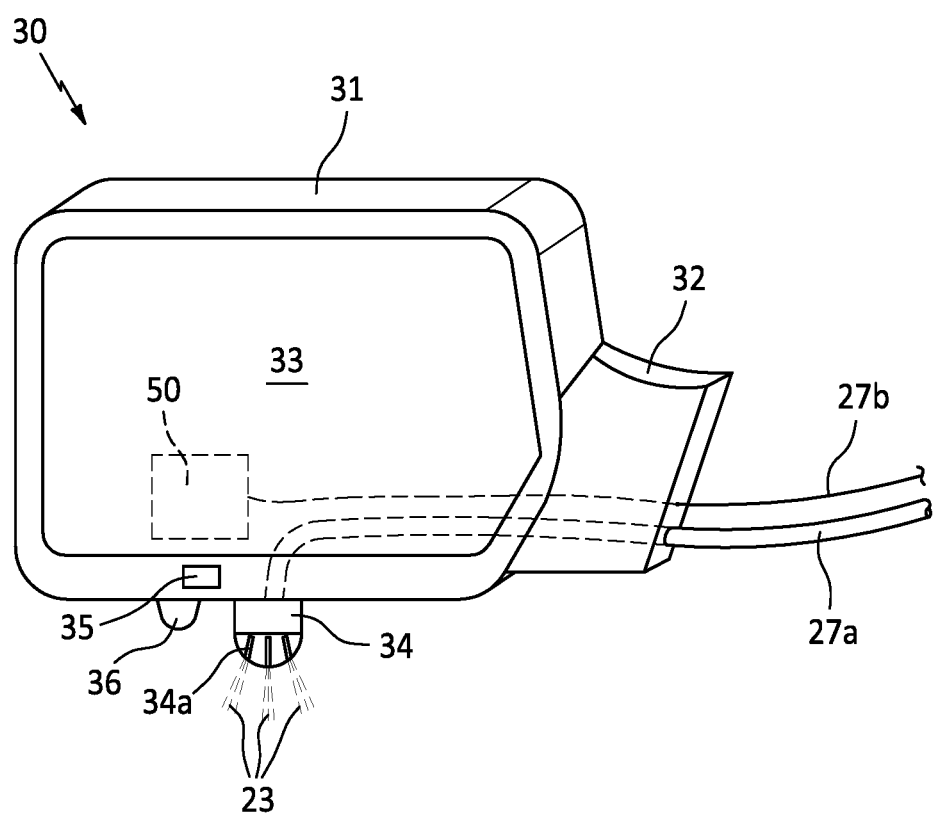
FIG. 3 is a perspective view of a first mirror dispensing unit, in accordance with one embodiment of the invention.

FIG. 3 illustrates one embodiment of a mirror dispensing unit 30 that is in communication with the reservoir and pumping assembly 20. As shown, the mirror unit can include a housing 31 that is configured for the left side of an automobile and can include a vehicle attachment column 32 and a mirrored surface 33. As described herein, the housing and attachment column can include any number of different shapes, sizes, colors and construction materials so as to form a visually identical replacement for an existing vehicle side view mirror and/or can be provided by a vehicle manufacturer so as to form an original vehicle component. Likewise, the mirrored surface can include any number of different shapes and sizes, and may include components such as blind spot monitoring sensors, anti-fog, and power movement components, among others, for example. Each of these systems being well known in the art.

In one embodiment, a discharge nozzle 34 can be positioned along the mirror housing 31 and can be connected to the fluid supply hose 27a of the control and supply line 27. As described herein, the nozzle can include any number of different shapes and sizes, and can include any number of apertures 34a for discharging the fluid 23 supplied by the pump 25 in varying densities such as a spray, mist, or continuous flow, for example. In some embodiments, the nozzle can include a user-selectable lever for permitting the user to change the output density of the nozzle.

In one embodiment, a control switch 35 can also be disposed along the mirror housing 31. The control switch can be connected to a dispenser controller 50, and can function to receive user inputs for selectively operating the pump 25 to discharge fluid 23 from the nozzle 34. For example, in one embodiment, activation of the control switch 35 can cause the pump to immediately begin dispensing fluid to the nozzle.

In one embodiment, a hand sensor 36 can be positioned along the main body 31 and can also be connected to the dispenser controller 50. The hand sensor can function to detect a user's hand when it is within a predetermined distance from the nozzle 34 and to selectively operate the pump 25 to discharge fluid 23 from the nozzle 34. The hand sensor 36 can be used in conjunction with the control switch 35 so as to permit the control switch to selectively enable or disable the hand sensor along with performing direct operation of the pump, as described above.

In the preferred embodiment, the sensor 36 can include an infrared motion sensor, and the predetermined distance can be between 1 and 5 inches, for example. Such a feature ensuring that the sensor will not detect external objects as the vehicle is in motion. Of course, any number of other sensors capable of detecting motion and/or any number of other distances are also contemplated.

Figure 4:
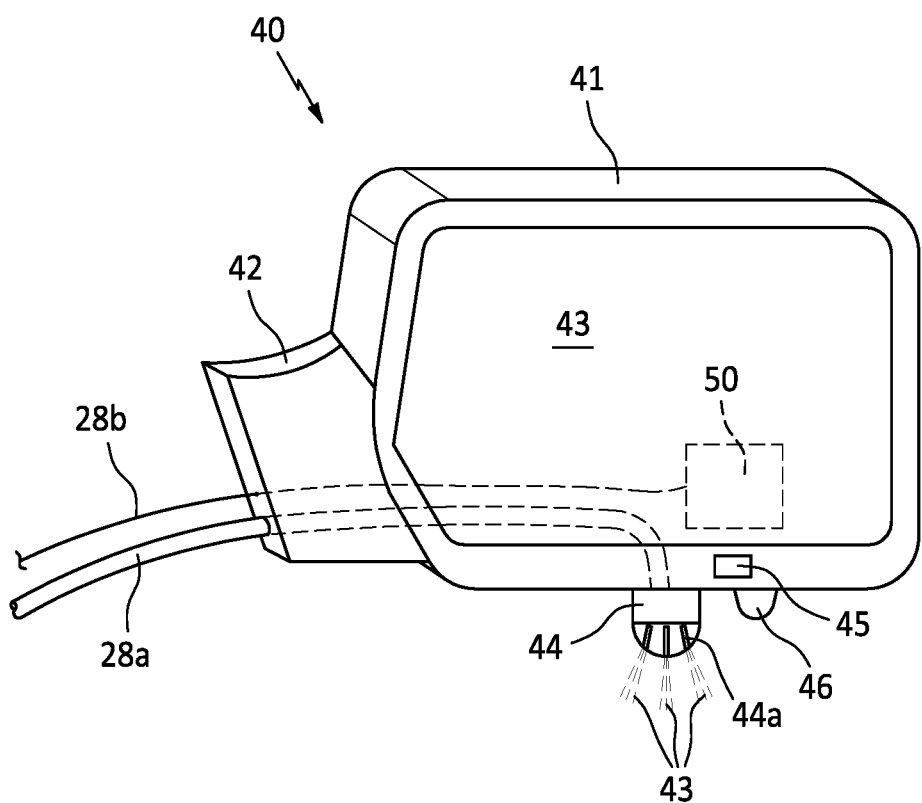
FIG. 4 is a perspective view of a second mirror dispensing unit, in accordance with one embodiment of the invention.

FIG. 4 illustrates one embodiment of a second mirror dispensing unit 40 that is in communication with the reservoir and pumping assembly 20. As shown, the mirror unit 40 can include a housing 41 that is configured for the right side of an automobile, and can include a vehicle attachment column 42, mirrored surface 43 discharge nozzle 44 connected to the fluid supply hose 28a of the control and supply line 28, control switch 45 and hand sensor 46. As described herein, components 41-46 can be identical to components 31-36 described above so as to be used on the right side of an automobile.

Although described and illustrated with regard to the system 10 including two mirror dispensing units 30 and 40, other embodiments are contemplated wherein the system comprises a single discharge unit 30 or 40.

Figure 5:
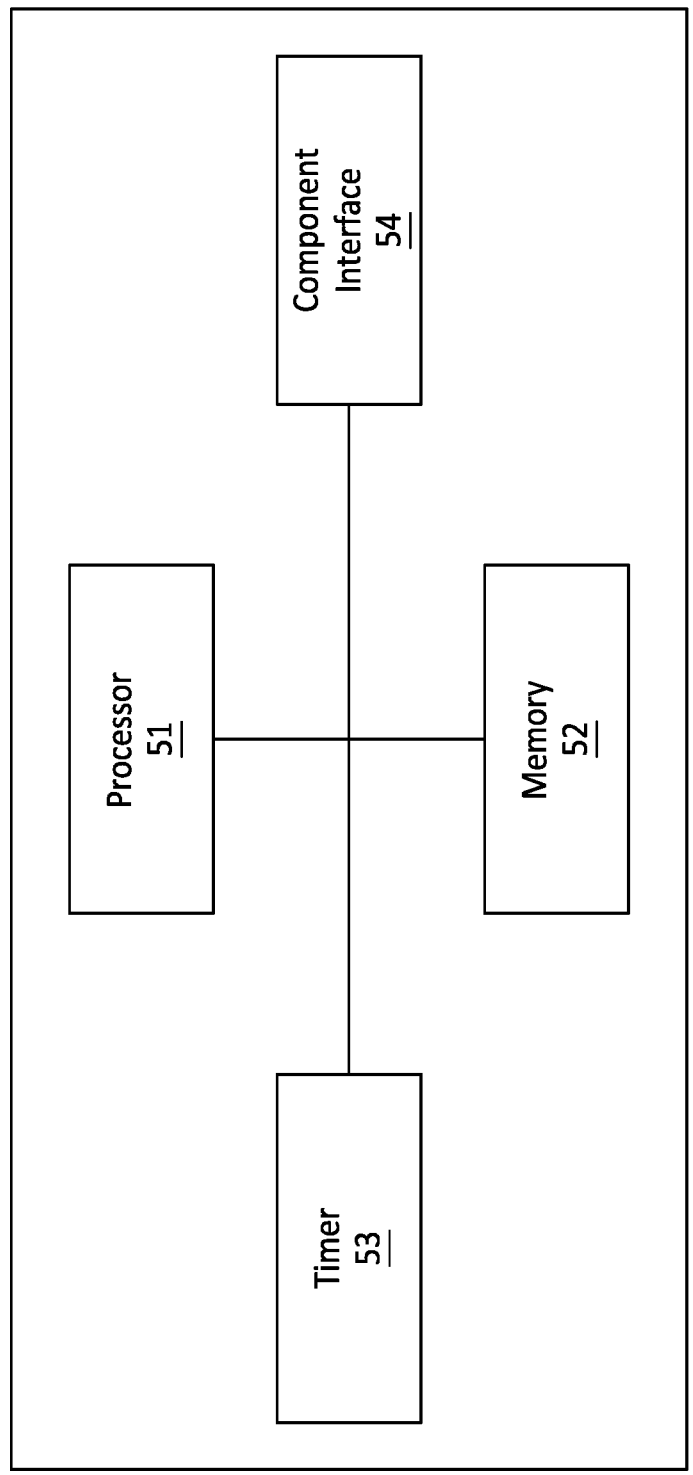
FIG. 5 is a simplified block diagram of the internal controller of the mirror dispensing units, in accordance with one embodiment of the invention.

FIG. 5 illustrates one embodiment of a dispenser controller 50, that can be positioned within each of the mirror dispensing units 30 and 40. As shown, the dispenser controller can include a processor 51 that is conventionally connected to an internal memory 52, a timer module 53 and a component interface 54.

Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The processor 51 can be a conventional central processing unit (CPU) or any other type of device, or multiple devices, capable of manipulating or processing information such as program code stored in the memory 52 and for causing the circuitry to complete the activities and functionality described herein.

The timer module 53 can function to accurately measure the passage of time. As described herein, the timer module can be provided as a function of the processor or can include a separate physical circuit. In this regard, the timer module can be preset to operate the pump for a select period of time such as 3 seconds, for example, upon activation by the switch or sensor. Of course, other times are also contemplated. As processors and timers are extremely well known in the art, no further description need be provided.

Memory 52 can act to store operating instructions in the form of program code for the processor 51 to execute.

Although illustrated in FIG. 5 as a single component, memory 52 can include one or more physical memory devices such as, for example, local memory and/or one or more bulk storage devices. To this end, the memory 52 can store operating instructions for allowing the system 10 to function in the manner herein described.

The component interface unit 54 can function to provide a communicative link between the processor 51 and various other device components such as the pump 25, fluid level sensor 26, activation switches 35/45, hand sensors 36/46 and power source/battery, for example. In this regard, the component interface unit can be connected to the control wire 27b/28b of the respective control and supply line 27 and 28, respectively, and can further include any number of different components such as one or more PIC microcontrollers, internal bus, USB connections and other such hardware capable of providing a direct link between the various components. Of course, any other means for providing the two-way communication and/or supplying the power requirements of the individual components can also be utilized herein.

In operation, the vehicle-mounted hand sanitizing system 10 can function to allow a user to quickly and easily sanitize their hands by simply placing one hand beneath the discharge nozzle of a mirror dispensing unit on their vehicle and activating the control switch or sensor. Such a feature beneficially allowing a user to sanitize or otherwise clean themselves when both arriving at and leaving any location, so as to help reduce or eliminate the spread of contagions.

As described herein, one or more elements of the system 10 and/or the individual dispensing units 30 or 40 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A hand sanitizing system, comprising:
   a central container body having a watertight interior space;
   at least one connector that is configured to secure the central container body to a vehicle;
   a first housing having a first nozzle that is in fluid communication with the central container body;
   a pump that is disposed between the first nozzle and the central container body;
   a first switch that is positioned along the first housing;
   a first controller that is in communication with each of the first switch and the pump;
   a second housing having a second nozzle that is in fluid communication with the central container;
   a second switch that is positioned along the second housing; and
   a second controller that is in communication with each of the second switch and the pump,
   wherein the first controller includes functionality for selectively operating the pump to supply a fluid stored within the central container body to the first nozzle, and
   the second controller includes functionality for selectively operating the pump to supply a fluid stored within the central container body to the second nozzle.

2. The system of claim 1, wherein the first housing and the second housing each comprise an automobile side mirror housing that is configured to be installed onto an automobile.

3. The system of claim 2, wherein each of the first housing and the second housing further include a mirrored surface along one side.

4. The system of claim 1, further comprising:
   a first supply and control line that is connected between the pump and the first nozzle; and
   a second supply and control line that is connected between the pump and the second nozzle.

5. The system of claim 1, wherein the pump the first controller and the second controller are configured to engage a power source of a vehicle to which the central container body is attached.

6. The system of claim 4, wherein the first supply and control line comprises an elongated tubular member that is configured to be positioned throughout a structure of the vehicle so as to engage the central container body and the first nozzle; and
   the second supply and control line comprises an elongated tubular member that is configured to be positioned throughout the structure of the vehicle so as to engage the central container body and the second nozzle.

7. The system of claim 1, wherein the central container body includes a shape and a size that is configured to receive and store between 1 and 5 gallons of the fluid.

8. The system of claim 1, further comprising:
   a first valve that is disposed between the pump and the first nozzle.

9. The system of claim 8, wherein the first controller is configured to control an operation of the first valve to selectively supply the fluid from the pump to the first nozzle.

10. The system of claim 1, further comprising:
    a second valve that is disposed between the pump and the second nozzle.

11. The system of claim 10, wherein the second controller is configured to control an operation of the second valve to selectively supply the fluid from the pump to the second nozzle.

12. The system of claim 1, further comprising:
    a dedicated battery that is in communication with the pump, the first controller and the second controller.

13. The system of claim 1, further comprising:
    a sensor that is positioned along the central container body, said sensor being configured to detect a level of the fluid within the central container body.

14. The system of claim 13, wherein at least one of the sensor and the first controller includes functionality for disabling an operation of the pump upon a determination by the sensor that the level of the fluid within the central container body is low.

15. The system of claim 13, wherein at least one of the sensor and the second controller includes functionality for disabling an operation of the pump upon a determination by the sensor that the level of the fluid within the central container body is low.

16. The system of claim 1, wherein the container body includes a removable lid for accessing and filling the container body with the fluid.

* * * * *